H. JUNKERS.
HYDRAULIC BRAKE.
APPLICATION FILED APR. 15, 1914.

1,228,215.

Patented May 29, 1917.
2 SHEETS—SHEET 1.

Witnesses:
Ludwig Wagenseil
Alfred Titley

Inventor:
Hugo Junkers

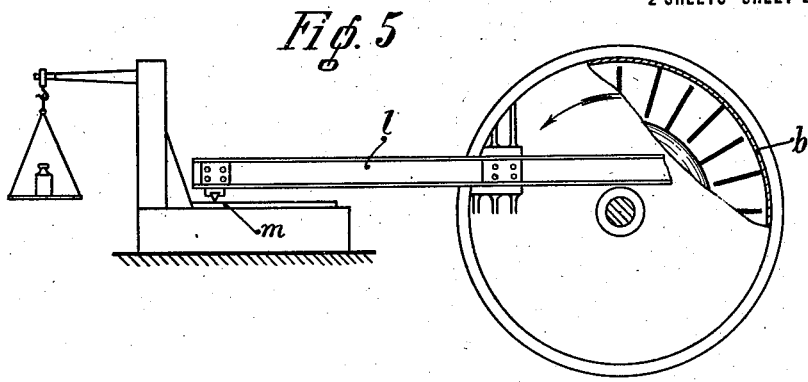
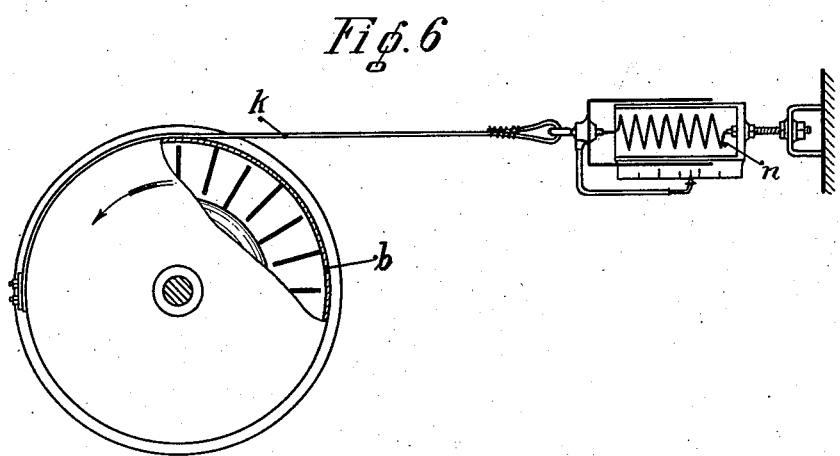
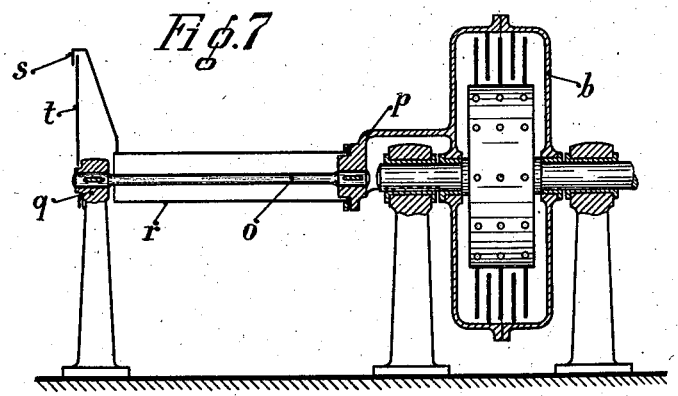

UNITED STATES PATENT OFFICE.

HUGO JUNKERS, OF AACHEN, GERMANY.

HYDRAULIC BRAKE.

1,228,215.  Specification of Letters Patent.  Patented May 29, 1917.

Application filed April 15, 1914. Serial No. 832,123.

*To all whom it may concern:*

Be it known that I, HUGO JUNKERS, a subject of the German Emperor, residing at Aachen, Frankenburg, in the Kingdom of Prussia, Empire of Germany, have invented certain new and useful Improvements in Hydraulic Brakes, of which the following is a specification.

This invention relates to hydraulic brakes or measuring devices for use in measuring the amount of power developed by an engine and consisting of a rotor adapted to be coupled to the engine and a stator forming with the rotor an inclosed space for the reception of a liquid which constitutes the braking medium. The invention involves the provision of a plurality of pins mounted upon the rotor and stator and projecting therefrom into the space occupied by the liquid. Preferably, the pins on the rotor and the pins on the stator are arranged in line so that the several groups of pins lie in planes transverse to the axis of rotation with the rows of pins on the rotor opposite the spaces between the rows of pins on the stator. By reason of the provision of such pins upon the rotor and stator, a relatively large amount of resistance to the rotation of the rotor is developed, the liquid in the space between the rotor and stator is evenly distributed, the retardation is not wholly dependent upon the friction between the liquid and the surface of the container therefor, and the apparatus may be employed in measuring the power output of engines operating at relatively low speed. Furthermore, the amount of wear incident to the use of the apparatus is very small and as the pins may expand freely, the water may reach a relatively high temperature without injuriously affecting the parts of the apparatus.

Figure 1:
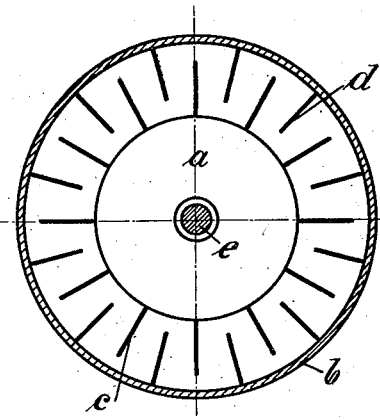
Figure 2:
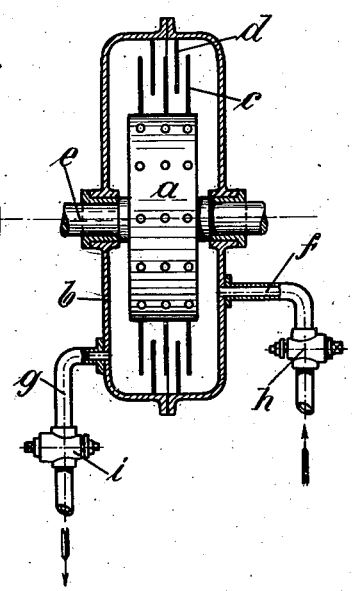
Figure 3:
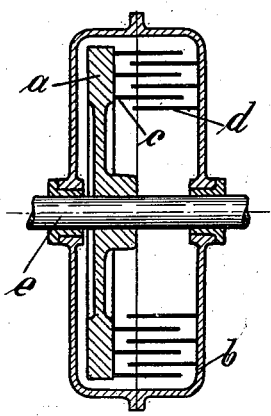
Figure 4:
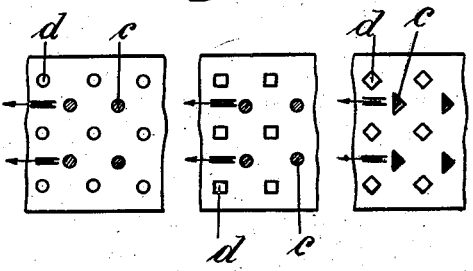

The preferred embodiment of the invention is illustrated in the accompanying drawings, in which Figures 1 and 2 are sectional views, transverse and parallel to the axis of rotation, respectively; Fig. 3 is a view corresponding to Fig. 2 and illustrating a modification; Fig. 4 is a view showing various shapes of pins which may be employed; and Figs. 5, 6 and 7 are diagrammatic views illustrating the apparatus which may be employed to indicate the amount of the braking effect.

Referring to the drawings, $a$ is the rotor secured upon the shaft $e$. The stator $b$ is in the form of a casing surrounding the rotor $a$ and provided with bearings through which the shaft $e$ extends. A plurality of radially disposed pins are mounted upon the rotor $a$, as shown at $c$. These pins are arranged in one or more rows circumferentially about the rotor $a$, three such rows being shown in Fig. 2. A plurality of pins $d$ are mounted upon the interior surface of the stator $b$, these pins $d$ being also arranged in rows circumferentially about the axis of rotation, and the rows of pins $d$ being opposite the spaces between the rows of pins $c$ upon the rotor. Water is admitted to the space between the rotor and stator by pipe $f$ controlled by a valve $h$ and the outlet for the heated water consists of a pipe $g$ provided with a valve $i$. By suitably adjusting the valves $h$ and $i$, the amount of water or other liquid within the casing $b$, and consequently the magnitude of the braking effect, may be regulated as desired.

If desired, the several pins $c$, and $d$ may be arranged parallel to the axis of rotation in the manner shown in Fig. 3, the pins $c$ projecting laterally from one face of the rotor $a$ and the pins $d$ extending laterally in the other direction from the opposite wall of the casing $b$.

The pins $c$ and $d$ may be of any cross sectional shape desired, as is indicated in Fig. 4, wherein the pins on the rotor are shaded while those on the stator are shown in outline. It will be noted that all of the pins on the rotor and stator are in the form of studs or columns and that they are free from reëntrant surfaces such as would be present on a pin which is convex on one side and concave on the other. Preferably, all of the pins are symmetrical with respect to the line of extension of the pins of that row, as, for instance, by making all of the pins circular or square in cross-section.

The shaft of the engine to be tested is connected in any suitable manner to the shaft $e$ of the braking device so that the rotor $a$ is caused to rotate within the casing $b$. As the several rows of pins $c$ on the rotor move through the spaces between the rows of pins $d$ on the stator, they throw the liquid against the fixed pins and the latter cause the liquid to be thrown back into the path of movement of the rotating pins. In this way the liquid is made to whirl about, causing the development of a large amount of friction and the transformation of energy into heat. No effort is made to give direction to the movement of the liquid so that it is unnecessary that the several pins be accurately finished or that their relative positions be accurately gaged.

As the apparatus may be operated in either direction, it is specially adapted for testing reversible engines.

It will be obvious that while I have shown the inner member of the couple as arranged to be rotated by the engine being tested, the reverse construction may be employed wherein the outer casing member is the rotor adapted to be driven by the engine while the inner member is relatively stationary.

In order to measure the output of the engine being tested, the member of the couple other than the one connected to the engine shaft may be so mounted as to permit it to move within a limited range and means may be employed for measuring the amount of its movement effected against a suitable resistance. Constructions which may be employed for this purpose are illustrated in Figs. 5, 6 and 7. In Fig. 5, a lever $l$ is shown secured at one end to the shell or casing $b$ of the couple and having its opposite end adapted to press upon a scale $m$, the beam of which carries a pan on which selected weights may be placed. In Fig. 6, the casing $b$ has a band or rope $k$ affixed thereto and the opposite end of this band or rope is connected by a spring $n$ to a fixed support. The amount of movement of the casing $b$ and band $k$ is indicated by a suitable index moving over a scale in the manner shown. In Fig. 7, the casing $b$ is shown as provided with a projection $p$ to which one end of a torsion rod is fastened, the other end of the rod being secured to a fixed support $q$. With this construction, the movement of the casing $b$ is accompanied by a torsional strain of the rod $o$ and its extent is indicated by an index $s$ mounted on a tubular extension $r$ of the projection $p$ and coacting with a scale $t$.

What I claim is:

1. A hydraulic testing apparatus comprising the combination of a rotor and a stator, one mounted within the other and providing space for a liquid between them, and a plurality of pins mounted on the rotor and stator at distributed points and projecting therefrom into the space in which the liquid is received, the pins on the rotor being shaped to throw the liquid against the pins on the stator and these pins on the stator being shaped to throw back the liquid against said pins on the rotor; substantially as described.

2. A hydraulic testing apparatus comprising the combination of a rotor and a stator, one mounted within the other and providing space between them for a liquid, and a plurality of pins upon the rotor and stator projecting into the space for the liquid, the pins being arranged in rows about the axis of rotation and the rows of pins on the rotor being opposite the spaces between the rows of pins on the stator, the pins of each row on the rotor having a cross-section symmetrical on both sides of the line of extension of the row; substantially as described.

3. A hydraulic testing apparatus comprising the combination of a rotor and a stator, one mounted within the other and providing a space between them for a liquid, and a plurality of pins upon the rotor and stator projecting into the space for the liquid, the rows of pins on the rotor being opposite the spaces between the rows of pins on the stator, the pins of each row on the stator having cross-sections symmetrical on both sides of the line of extension of the row; substantially as described.

4. A hydraulic testing apparatus comprising the combination of a rotor and a stator, one mounted within the other and providing a space between them for a liquid, and a plurality of pins upon the rotor and stator projecting into the space for the liquid, the rows of pins on the rotor being opposite the spaces between the rows of pins on the stator, the pins of the rows on both the rotor and the stator having a cross-section symmetrical on both sides of the line of extension of the row; substantially as described.

5. A hydraulic testing apparatus comprising the combination of a rotor adapted to be connected to the engine to be tested, a casing surrounding the rotor and providing a space for a liquid between it and the rotor, and a plurality of pins mounted at distributed points projecting outwardly from the rotor and inwardly from the casing, the pins in the form of columns free from reëntrant surfaces and being arranged in rows about the axis of rotation with the rows of pins on the rotor opposite the spaces between the rows of pins on the casing.

In testimony whereof I affix my signature in presence of two witnesses.

HUGO JUNKERS.

Witnesses:
   LUDWIG WAGENSEIL,
   ALFRED MILLER.